May 30, 1961  A. SIKULA  2,986,168
CONTROL VALVE
Filed Oct. 8, 1958  2 Sheets-Sheet 1
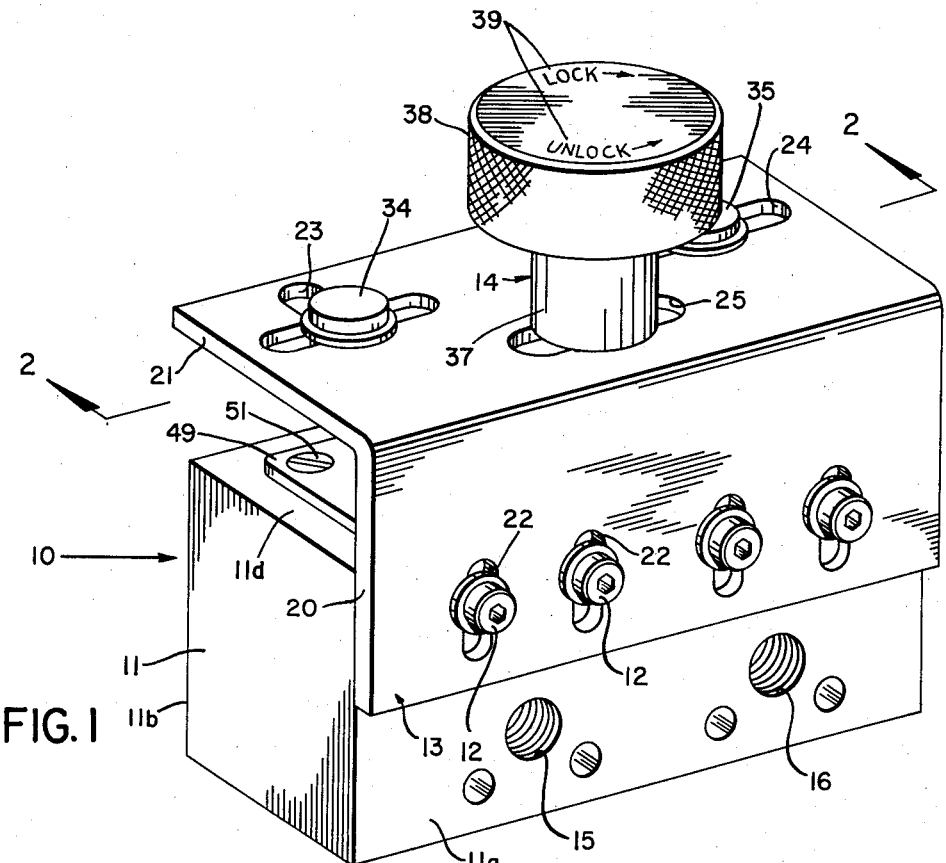
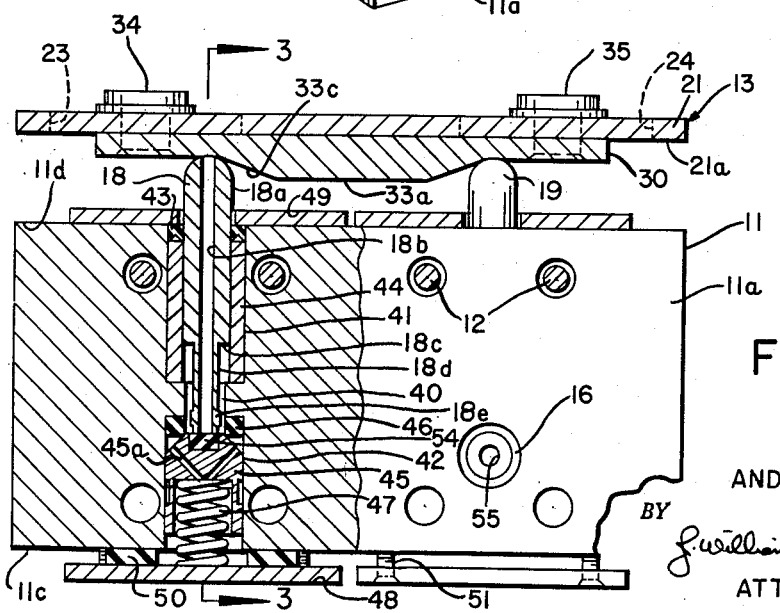
INVENTOR.
ANDREW SIKULA
BY
ATTORNEY May 30, 1961  A. SIKULA  2,986,168
CONTROL VALVE
Filed Oct. 8, 1958  2 Sheets-Sheet 2
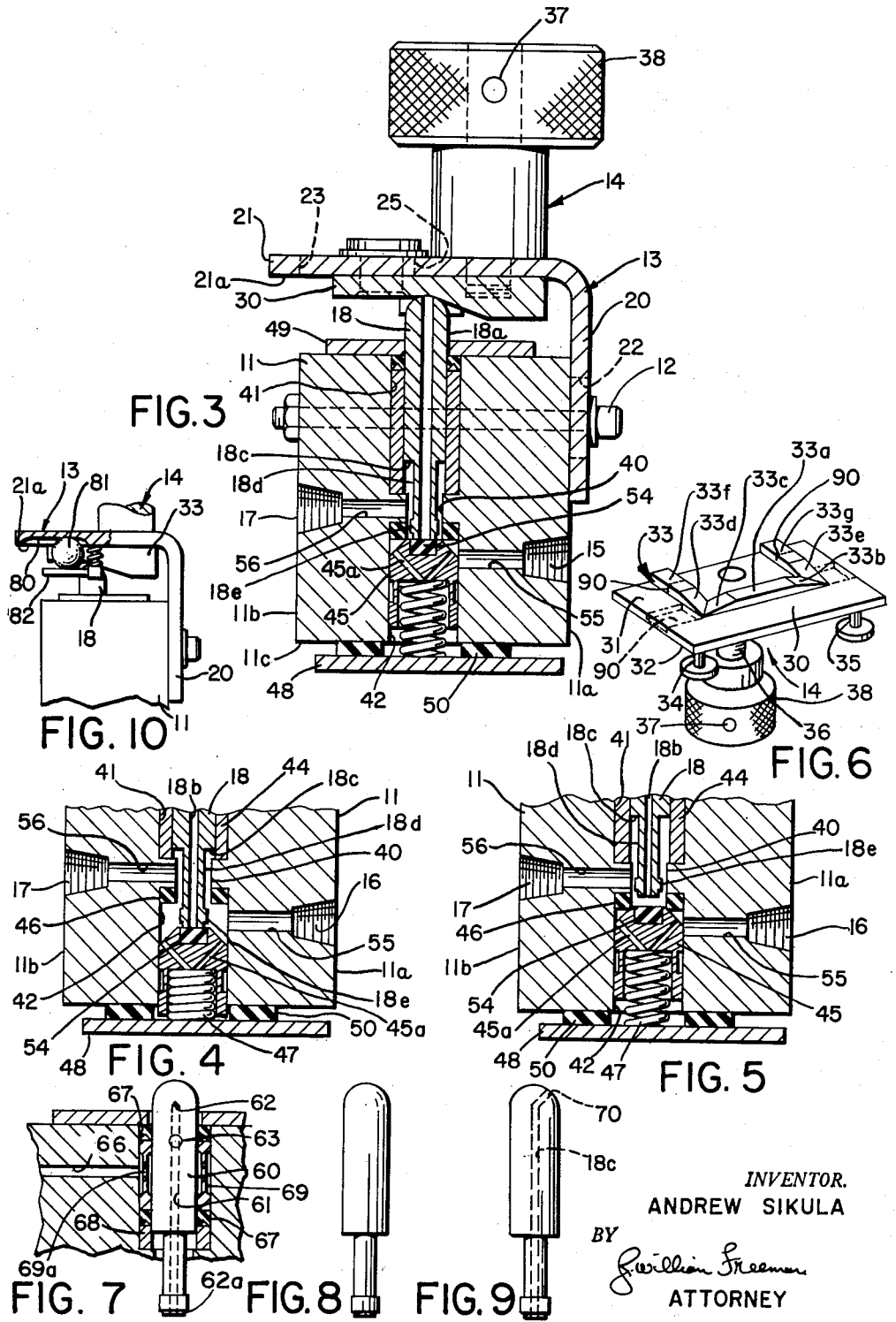
INVENTOR.
ANDREW SIKULA
BY William Freeman
ATTORNEY

2,986,168

CONTROL VALVE

Andrew Sikula, 1218 4th Ave., Akron, Ohio

Filed Oct. 8, 1958, Ser. No. 766,034

7 Claims. (Cl. 137—627.5)

This invention relates to the art of control valves, and in particular has reference to a control mechanism for selectively controlling the amount of air or fluid flowing in each of a plurality of outlets.

In the art of fluid flow control, the problem has oftentimes been presented of controlling the amount of fluid flow in either one, or both, of a plurality of fluid lines. In the past the most satisfactory arrangement used to effectuate such control has been to provide a separate valve for each fluid line with the fluid lines thus being individually controlled by the separate valves.

While this arrangement is in some instances satisfactory, it is frequently the case that the fluid flow must be started in the two lines at the same instant, and in situations of this type, difficulty is frequently encountered in manually timing the operation of the individual valves. Additionally, it is frequently desired to have one line only in operation, and in situations of this type, there is frequently confusion in operation of the valve.

In this regard, it is normally not possible to employ a diverter type of valve arrangement in connection with installations of this type due to the fact that the normal diverter type of valve precludes use of both lines at the same time, with the primary function of this type of valve being to selectively divert fluid flow from one line into the other.

It has been discovered that improved results can be obtained if a pair of valving elements are disposed in a single valve body, with a control lever being associated with the valve body to selectively operate either one, or both, of the valve elements. In this manner, movement of the valve handle in one direction will cause flow in one line, while movement in the opposite direction would cause flow to occur in the remaining line, while terminating flow in the first line. Additionally, fluid flow in both lines could be controlled by right angle movement to effectuate operation of both valving mechanisms in unison.

It has additionally been discovered in this regard, that if the valving mechanism employed utilizes a built-in exhaust system that is automatically operated upon switching of the same, that improved results will occur.

Accordingly, it becomes the principal object of this invention to provide an improved type of control valve that is characterized by the ability of the same to control fluid flow in two lines with it being possible to have flow in either, or both, of the lines, dependent upon the position of the switching means employed.

It becomes a further object of this invention to provide a control valve having improved valving mechanisms contained therein with the improved mechanism simplifying the operation of control of the valve while enhancing the overall utility of the same.

These and other objects of this invention will become more apparent upon a reading of the following brief specification, considered and interpreted in the light of the accompanying drawings.

In the drawings:

Figure 1 is a perspective view of the improved control valve.

Figure 2 is a sectional view taken on the lines 2—2 of Figure 1.

Figure 3 is a sectional view taken on the lines 3—3, of Figure 2.

Figures 4 and 5 are views similar to Figure 3 but showing the position of the component parts at different times during use.

Figure 6 is a perspective view of the control plate employed in the device.

Figures 7, 8 and 9 are elevational views of modified forms of control elements.

Figure 10 is a vertical section of a modified form of the invention.

Referring now to the drawings, and in particular to Figure 1, the improved control valve, generally designated by the numeral 10, includes a rectangular shaped valve body 11 that has adjustably secured thereto, as by bolts 12, 12, a guide plate 13; the arrangement being such that the guide plate 13 controls the positioning of a control handle 14 that is movable relatively of plate 13, as will be hereinafter described. Additionally, inlet ports 15 and 16 are shown provided on the face 11a of valve body 11, it being understood that outlet ports 17, 17 (see Figures 3 through 5) are provided on the opposed face 11b of the valve body.

In this manner, and referring to Figure 2, the control handle 14 will, upon shifting relatively of guide plate 13, depress one or both of the valve plunger members 18 or 19 so as to control the flow of fluid through outlet ports 17, 17.

Referring first to the construction of the guide plate 13, it will be seen that the same is of generally right angle configuration so as to include angularly disposed leg portions 20 and 21, with the leg portion 20 including slots 22, 22 through which the bolts 12 are received so as to adjustably secure the leg portion 20 in coplanar abutment with the rear face 11a of body 11. Similarly, T-shaped slots 23, 24 and 25 are provided in leg portion 21 for coaction with certain elements of the control handle 14, as will now be described.

To this end, and referring in particular to the perspective view of the control handle 14 shown in Figure 6, it will be seen that the same includes a plate member 30 threaded onto stud 36, with plate 30 having opposed faces 31 and 32, with the face 31 being provided with a raised, U-shaped cam portion 33, while pin members 34 and 35 and stud 36 project from the face 32 for respective reception within the T-shaped slots 23, 24 and 25. In this regard, the stud 36 is preferably threaded for engagement with the internally threaded aperture of plate 30, with stud 36 having received thereon an enlarged knurled handle 38 upon which are provided turn indicia 39 as shown in Figure 1. In this regard, set screw 37 normally non-rotatably retains handle 38 on stud 36. Accordingly, upon rotating of stud 36 and handle 38 in "lock" direction, plate 30 will be drawn against the under surface of leg portion 21 with the result that shifting movement of control handle 14 relatively of guide plate 13 will be obviated.

With regard to the specific configuration of the U-shaped cam 33, it will be noted that the base portion 33a thereof includes inclined end edge surfaces 33b and 33c, while similar inclined edge surfaces 33d and 33e are provided adjacent the ends of the leg sections 33f and 33g. In this manner, the valve plungers 18 and 19 may be shifted axially of body 11 upon shifting of the inclined surfaces transversely thereof. In this manner, and assuming the end of valve plunger 18 is in contact with the leg section 33d as shown in Figure 3, the plunger 18 will be depressed and will move away from surface 31 upon shifting to the left of member 14, with cam surfaces 33d and 33f moving across the axial end of plunger 18 during said shifting. Conversely, upon shifting of the cam member back to the condition of Figure 3, the plunger 18 will leave surface 33f and pass over inclined cam surface 33d to effectuate a raising of plunger 18.

Referring next to Figures 2 through 5 inclusive for a detailed consideration of the valving mechanism per se, it will first be assumed that the structure associated with the members 18 and 19 is, in each case, identical and, accordingly, a detailed description will be undertaken only with respect to the structure shown in association with valve plunger 18, it being understood that a similar type of structure will be present with regard to valve plunger 19.

Accordingly, and referring to Figure 2, it will be seen that the valve body is provided with a bore 40, that is counterbored as at 41 and 42, for the purpose of receiving a valving member 45 and sleeve 44; the arrangement being such that valve plunger 18 has the large diameter portion 18a thereof slidable within the internal wall of sleeve 44, while a lower portion of valving member 45 is received within counterbore 42 so as to be spring loaded against packing seat 46 by spring 47, with spring 47 being seated against cover plate 48 and being maintained in centralized condition by having its opposed end seated within the bored out portion of member 45 as shown in the drawings. Additionally, a top cover plate 49 is provided over counterbore 41, with plates 48 and 49 being secured to the surfaces 11c and 11d respectively by the usual screws 51, 51, while gaskets 50, 50 space the plates from their respective mounting surfaces in known fashion.

In addition to the aforementioned component parts, the pin member 18 includes a central bore 18b, as well as a shoulder 18c that is defined by a reduced diameter portion 18d. A raised annular portion 18e completes the structural arrangement of the pin 18 with the inner axial end thereof seating against a resilient packing 54 that is carried by the member 45, as shown in the drawings. Additionally, and as shown in Figures 3 through 5 inclusive, bores 55 and 56 communicate each outlet port 17 and each inlet port 15 or 16 with the bore 40, in known fashion, while openings 45a are provided in member 45 for purposes to be described.

In use or operation of the member device, it will first be assumed that the component parts have been assembled as shown in Figures 1 and 2, and further that the plunger 18 is in the partially extended position shown in Figures 2 and 3. At this time, fluid entering through bore 55 will enter into the annular space between counterbore 42 and valving member 45. Fluid so entering will pass through openings 45a, 45a but will be trapped against axial escape by the gaskets 50, 50 and the sealing contact of member 45 with seat member 46. Accordingly, this fluid will be unable to gain access to bore 56, with the result that the valve will be in closed position.

When it is desired to open the line 17, for example, it is merely necessary that the handle knob 38, together with stud 36 be shifted relatively of plate 13 to the left of Figure 2, at which time the inclined surface 33c will cause the plunger 18 to be depressed against the force of spring 47. When this fully depressed condition has been reached, plunger 18 will be engaged with surface 33a and the component parts will be positioned as shown in Figure 4, and at this time it is believed manifest that the fluid can emit through port 17, due to the now present clearance between shaft portion 18d and bore 40.

When it is desired to terminate flow, it is merely necessary to return stud 36 and handle 38 to the position of Figure 2, at which time the line 17 will be closed.

When it is desired to exhaust line 17, it is merely necessary that the bolts 12, 12 be loosened and plate 13 moved upwardly (Figure 3) so as to take the cam 33 out of engagement with the end of plunger 18. At this time, further axial projecting movement of the plunger 18 may occur, with this condition being indicated in Figure 5 where the plunger 18 has shifted out of contact with member 54. Upon this happening, the pressure in line 17 will be exhausted against shoulder 18c to raise the plunger 18 for evacuation to the atmosphere. Repositioning of the member 13 to the position of Figure 3 so that cam 33 contacts plunger 18 will result in closing of the valve as shown in Figure 3.

It will be seen from the foregoing that there has been provided a new and novel type of control valve that is characterized by the positive type of switching action that permits operation of one or both of a pair of fluid lines, with adequate provision being made for automatically exhausting the line after the sufficient supply has been produced. It has been shown how the device is simple in operation with the result that minimal error can occur in use thereof. Further, it is believed apparent that the threading of stud 36 and handle 38 into plate 30 permits these members to be rotated relatively of plate 30 and, thus, effectuate a locking action. Also, stud 36 and handle 38 could be locked against plate 13 midway between the positions of Figure 3 and Figure 4 so that a condition of controlled flow would exist. A similar condition could be achieved upon shifting of member 13 to effectuate a locked position between Figures 3 and 5 and in this fashion, a controlled exhaust would exist.

The modified forms of the invention shown in Figures 7, 8 and 9 have to do with modified forms of valve plungers used as control elements in the valve body. Accordingly, it is to be understod that the remaining valve structure is similar and that the construction of the plunger alone varies in these instances except as otherwise indicated.

Accordingly, the valve plunger 60 shown in Figure 7 includes an internal bore 61 that terminates in an internal end 62 with a transverse bore 63 being provided at a point that is axially spaced from end 62a so as to cause exhaust within counterbore 41. In this manner, fluid can be exhausted into counterbore 41 and out of the side of body 11 through bore 66 rather than through the top, as was the case in Figures 1 through 6. The usual packings 67, 67 and spacers 68 and 69 are provided, with spacer 69 including aperture 69a for permitting escape of fluid leaving plunger 60. It has been found that this modification has particular utility where the fluid involved is water or steam.

The valve plunger of Figure 8 does not contemplate the provision of exhaust means and, accordingly, it is intended for use in a system wherein no exhaust provision is necessary. It accordingly follows that this plunger is the duplicate of plungers 18 and 19 of Figures 1 through 6 except that the same is not provided with an internal bore for exhaust purposes.

Similarly, Figure 9 shows the bore 18c terminated in an angularly projecting bore 70 that avoids direct axial exhaust, as is the case in Figures 1 through 6 inclusive. In this regard, it is to be understood that any two of the various plungers described could be used in a single valve body where required.

In the Figure 10 modification, means are provided for centering the control handle 14 with respect to the guide plate 13 and accordingly, leg portion 21 is shown having a furrow 80 provided medianally of face 21a thereof. In this fashion, a ball 81, carried by cam 33 and spring loaded by spring strap 82, will snap ball 81 into furrow 80 when member 14 is centered on plate 13. Similarly, when plate 33 is shifted to the left of Figure 10 to depress both plungers 18 and 19 in unison as has been described, the ball 81 will move in furrow 80 to minimize frictional resistance.

The remaining modification of the invention has to do with reference to certain means for facilitating exhaust of the member 18 when the same is in the position of Figure 5; and accordingly, and as best shown in Figure 6 of the drawings, the plate 30 may be provided with cut out portions 90, 90, as indicated in chain dotted lines in Figure 6 of the drawings. In this fashion, it will be unnecessary to loosen the bolts 12 and rest the member 13 so as to disengage the plunger 18 from the cam 33. Accordingly, in use of this modification wherein a slot was provided in the plate 30 in the area indicated by the dotted lines 90, it would merely be necessary to overshift the member 14, it being readily understood that the slots 23, 24 and 25 could readily be enlarged for this purpose.

In this connection, it also follows that in any case, the exhaust condition is controlled by the vertical spacing between the leg portion 21 and the top surface 11d of the body member. Thus, if the same is in the condition of Figure 3, it is apparent that no exhaust can occur, since the contact between plunger 18 and member 54 cannot be broken in this condition. Accordingly, provision must be made for the member 18 to be extended upwardly of the position of Figure 3 in order to permit the same to move to the exhaust condition shown in Figure 5. Preferably, this is accomplished by elongate slots 22, 22, but the openings 90, 90 could be provided for this purpose.

Additionally, it is to be understood that while the valving member has been described as being manually manipulated, either solenoid or foot type of operation could be achieved without deviating from the operating principles herein involved; and accordingly, the provision of foot actuated and/or solenoid mechanism is intended to fall within the scope of this invention.

While a full and complete disclosure of the invention has been set forth in accordance with the dictates of the patent statutes, it is not intended that the invention be so limited. Accordingly, where appropriate modifications of the invention may be resorted to without departing from the spirit hereof or the scope of the appended claims.

What is claimed is:

1. In combination with a valve body having a pair of valving elements that are shiftable relatively of said valve body to control fluid flow through a pair of fluid lines that lead into and out of said valve body; cam means associated with said body and being selectively engageable with said valving elements; said cam means being shiftable relatively of said body in at least two different substantially straight line paths of movement whereby said valves may be operated independently of each other upon shifting of said cam means in one direction while being operated in unison upon shifting of said cam means in said remaining direction.

2. The combination of claim 1 further characterized by the fact that at least one said valve means may be exhausted.

3. A valving mechanism of the character decsribed, comprising; a valve body having a pair of inlet and outlet openings; valve control elements shiftably carried by said valve body and interposed between each said inlet and outlet openings whereby fluid flow therebetween may be controlled upon shifting of said elements; a guide plate carried by said body and overlying one face thereof adjacent said elements; and cam means carried by said guide plate in shiftable relationship therewith and being selectively engageable with said elements; said cam means being shiftable relatively of said body in at least two different substantially straight line paths of movement; said cam means moving at least one said element relatively of said remaining element upon shifting thereof through one path of substantially straight line movement while moving said elements in unison upon movement of said cam means through the remaining straight line path of movement.

4. The device of claim 3 further characterized by the fact that said respective straight line paths of movement of said cam means are disposed at substantially right angles to each other.

5. A valving mechanism of the character described comprising; a valve body having a pair of inlet and outlet openings; elongate valving elements carried by said valve body in axially shiftable relationship therewith and having one axial end thereof projecting beyond one face of said valve body with said valving elements controlling flow between said inlet and outlet ports upon axial shifting thereof; a guide plate carried by said valve body and overlying said projecting ends of said valving elements; and cam means carried by said guide plate in shiftable relationship therewith and being selectively engageable with said elements; said cam means being shiftable relatively of said body in at least two different substantially straight line paths of movement; said cam means moving at least one said element relatively of said remaining element upon shifting thereof through one path of substantially straight line movement while moving said elements in unison upon movement of said cam means through the remaining straight line path of movement.

6. The device of claim 5 further characterized by the fact that said valving elements are urged into a condition of maximum projection beyond said valve body upon release of contact between said valving elements and said cam means.

7. The device of claim 6 further characterized by the fact that at least one said outlet line may be exhausted when said valving element associated therewith is in its condition of maximum projection beyond said valve body.

References Cited in the file of this patent

UNITED STATES PATENTS

| 1,095,003 | Leonard | Apr. 28, 1914 |
| 1,603,082 | Jacobs | Oct. 12, 1926 |
| 2,534,509 | Franck | Dec. 19, 1950 |
| 2,781,783 | Ross | Feb. 19, 1957 |
| 2,793,653 | Payne | May 28, 1957 |

FOREIGN PATENTS

| 44,059 | Netherlands | Sept. 15, 1938 |
| 1,138,043 | France | Jan. 21, 1951 |
| 1,090,133 | France | Oct. 13, 1954 |
| 747,378 | Great Britain | Apr. 4, 1956 |
| 190,810 | Austria | July 25, 1957 |